United States Patent

Sogell

[19]

[11] Patent Number: 6,048,461

[45] Date of Patent: Apr. 11, 2000

[54] METHOD AND SYSTEM FOR CLEANSING WATER FROM OIL

[75] Inventor: Göran Sogell, Lidingö, Sweden

[73] Assignee: Foxhammar AB, Linköping, Sweden

[21] Appl. No.: 09/180,996

[22] PCT Filed: May 16, 1997

[86] PCT No.: PCT/SE97/00807

§ 371 Date: Nov. 19, 1998

§ 102(e) Date: Nov. 19, 1998

[87] PCT Pub. No.: WO97/44219

PCT Pub. Date: Nov. 27, 1997

[30] Foreign Application Priority Data

May 20, 1996 [SE] Sweden .................................... 9601903
May 15, 1997 [SE] Sweden .................................... 9701815

[51] Int. Cl.[7] .................................. C02F 1/40; B60S 3/00
[52] U.S. Cl. .......................... 210/651; 210/652; 210/693; 210/694; 210/791; 210/799; 210/805; 210/806; 210/167; 210/170; 210/259; 210/409; 210/500.21; 210/502.1; 210/503; 210/510.1; 210/908
[58] Field of Search .................................... 210/650, 651, 210/693, 694, 791, 797, 798, 799, 805, 806, 167, 170, 196, 252, 259, 321.6, 407, 409, 500.21, 502.1, 503, 510.1, 908, 652

[56] References Cited

U.S. PATENT DOCUMENTS 4,784,773 11/1988 Sandberg ................................. 210/691

FOREIGN PATENT DOCUMENTS

| 394354 | 9/1991 | Austria . |
|---|---|---|
| 1407894 | 11/1975 | United Kingdom . |
| 2247191 | 2/1992 | United Kingdom . |
| WO 82/04435 | 12/1982 | WIPO . |
| WO 95/29877 | 11/1995 | WIPO . |

*Primary Examiner*—Robert Popovics
*Attorney, Agent, or Firm*—Alfred J. Mangels

[57] ABSTRACT

A method and apparatus for extracting oil from water, particularly spillage water from gasoline stations and water that emanates from vehicle-washing plants. The method and apparatus utilize filters to which contaminated water from the vehicle-washing plant and other contaminated water is passed. The water is cleansed in one or more mutually sequential filters arranged in the flow direction of the water. The water is cleansed by first causing the water to flow through a collection filter in which oil and coarse particles are collected in a first cleansing stage. The water from the collection filter is passed through a fine filter adapted to lower the oil content of the water to a level below about 50 to 70 mg/l in a second cleansing stage. The water from the fine filter then flows through a membrane filter that is adapted to filter-off at least 75% of the oil remaining in the water during a third cleansing stage. At least a substantial part of at least the water cleansed in the membrane filter is recycled back to the vehicle-washing plant while any residual part of that water is discharged to a municipal sewage network.

15 Claims, 2 Drawing Sheets

METHOD AND SYSTEM FOR CLEANSING WATER FROM OIL

BACKGROUND OF THE INVENTION

The present invention relates to a method and to a system for cleansing water from oil, and more particularly for cleansing water spillage in gasoline or petrol stations.

The present invention is concerned more particularly with cleansing vehicle wash water with respect to its oil and heavy metal content.

DESCRIPTION OF THE RELATED ART

Many countries stipulate that sewage water from vehicle-washing facilities shall be essentially free from oil, or at least have a very low oil content. Under Swedish regulations, the oil content of sewage water must be below 50 mg/l as from the year 1997.

One known method of extracting oil from oil-contaminated waste water is to feed the water into a flocculating chamber connected to a slime separator located at the gasoline station. This method achieves a purification of 75%–85%. However, the method is not sufficiently effective to achieve the aforesaid purification level, and the water leaving the purification plant will typically have an oil concentration of 150 mg/l or higher.

Filters with which the oil content of oil-contaminated water can be greatly reduced are known to the art. The membrane filter is one such filter type. Such filters are expensive, however. Furthermore, membrane filters have a relatively low capacity with regard to the amount of oil that is extracted, and consequently it would be necessary to connect a large number of membrane filters in parallel in order to cleanse satisfactorily sewage water that derives from vehicle-washing plants, this water normally having an oil concentration as high as 150 mg/l.

It would appear that although waste water cleansing or purifying techniques are known to the art, the techniques are not economically viable with regard to vehicle-washing plants, where a typical water consumption is about 400 liters with each vehicle wash.

The present invention solves this cleansing problem and provides a relatively inexpensive arrangement which has a very high cleansing efficiency.

SUMMARY OF THE INVENTION

The present invention thus relates to a method of extracting oil from water, particularly spillage water from gasoline stations, including water that emanates from vehicle-washing plants, having filters to which contaminated water from the vehicle-washing plant and possibly other contaminated water spillage is passed. The water is cleansed in one or more mutually sequential filters in the flow direction of the water by causing the water to flow through a collection filter in which oil and coarse particles are collected in a first cleansing or purifying stage. The water from the collecting filter is caused to pass through a fine filter which is adapted to lower the oil content of the water to a level below approximately 50–75 mg/l in a second cleansing or purifying stage. The water from the fine filter is caused to flow through a membrane filter which is adapted to filter-off at least 75% of the oil remaining in the water in a third cleansing or purifying stage. At least a substantial part of at least the water cleansed in the membrane filter is recycled back to the vehicle-washing plant while any residual part of said water is discharged to a municipal sewage network.

The present invention also relates to apparatus for carrying out the inventive method.

BRIEF DESCRIPTION OF THE DRAWINGS

The invention will now be described in more detail with reference to two exemplifying embodiments thereof and also with reference to the accompanying drawing.

DESCRIPTION OF THE PREFERRED EMBODIMENTS

Figure 1:
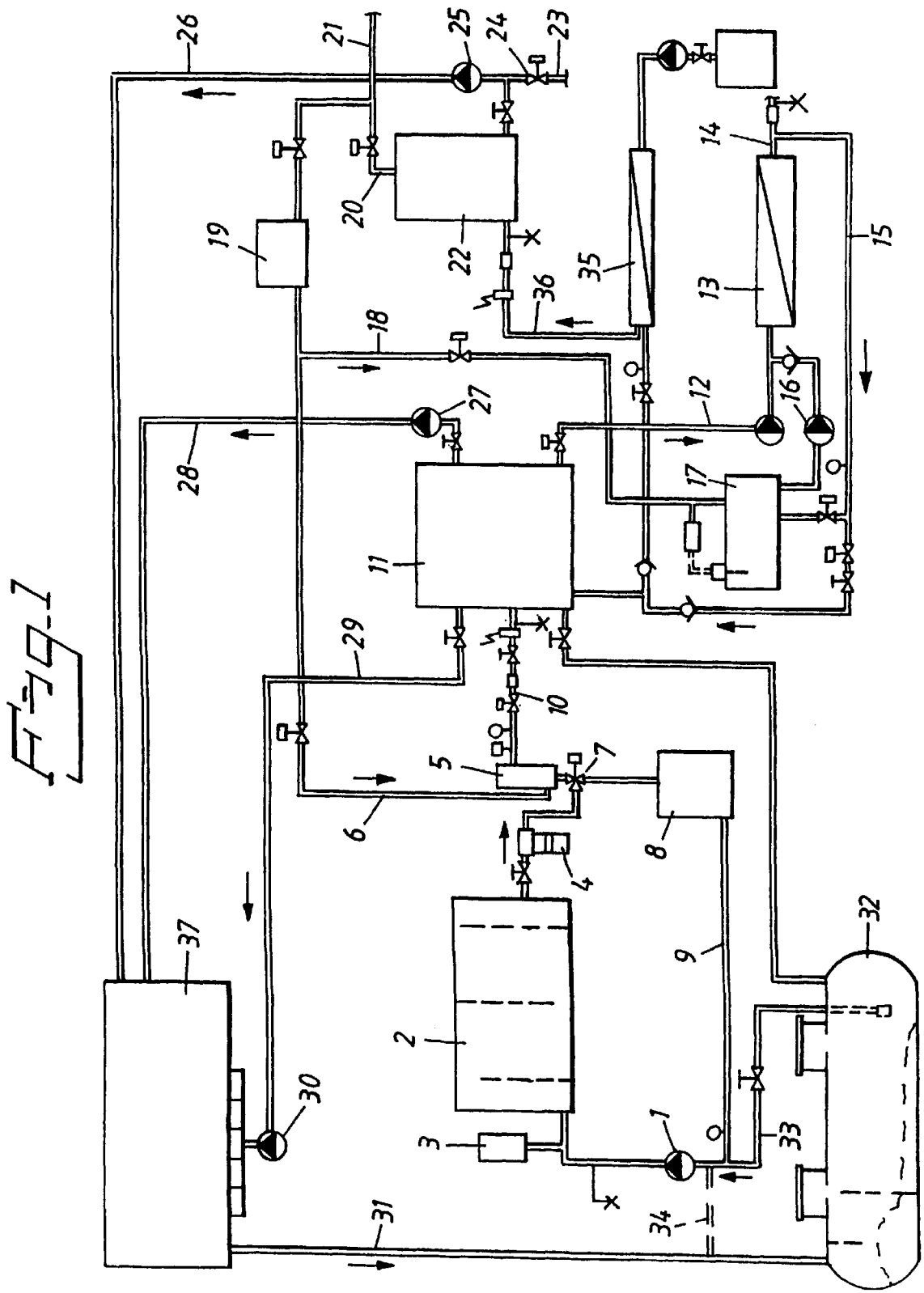
FIGS. 1 and 2 are each flowsheets that show a respective embodiment of the present invention in which conventional fluid system symbols have been used. Consequently, not all units will be described in the following.

FIG. 1 illustrates a first embodiment of the invention, wherein the numeral 1 identifies a feed pump, numeral 2 identifies a flocculating chamber, numeral 3 identifies a flocculating agent metering tank, numeral 4 identifies a collection filter and numeral 5 identifies a fine filter.

The collection filter 4 is of a kind in which large particles, such as clumps of oil from the flocculating chamber, are extracted mechanically and remain in the filter. The filter may include metal gratings, grids, or the like. The collection filter is thus emptied at given time intervals.

The fine filter 5 is of a kind that can be cleansed by delivering clean or fresh water thereto from the municipal or local water mains. One suitable known type of filter in this regard is a sand filter. In this case, clean water or fresh water is passed through a conduit means 6 and through the filter 5 and from these to a drainage tank 8 via a three-way valve 7. This water is circulated back to the flocculating chamber 2 through a conduit mean 9 and the feed pump 1.

Figure 2:
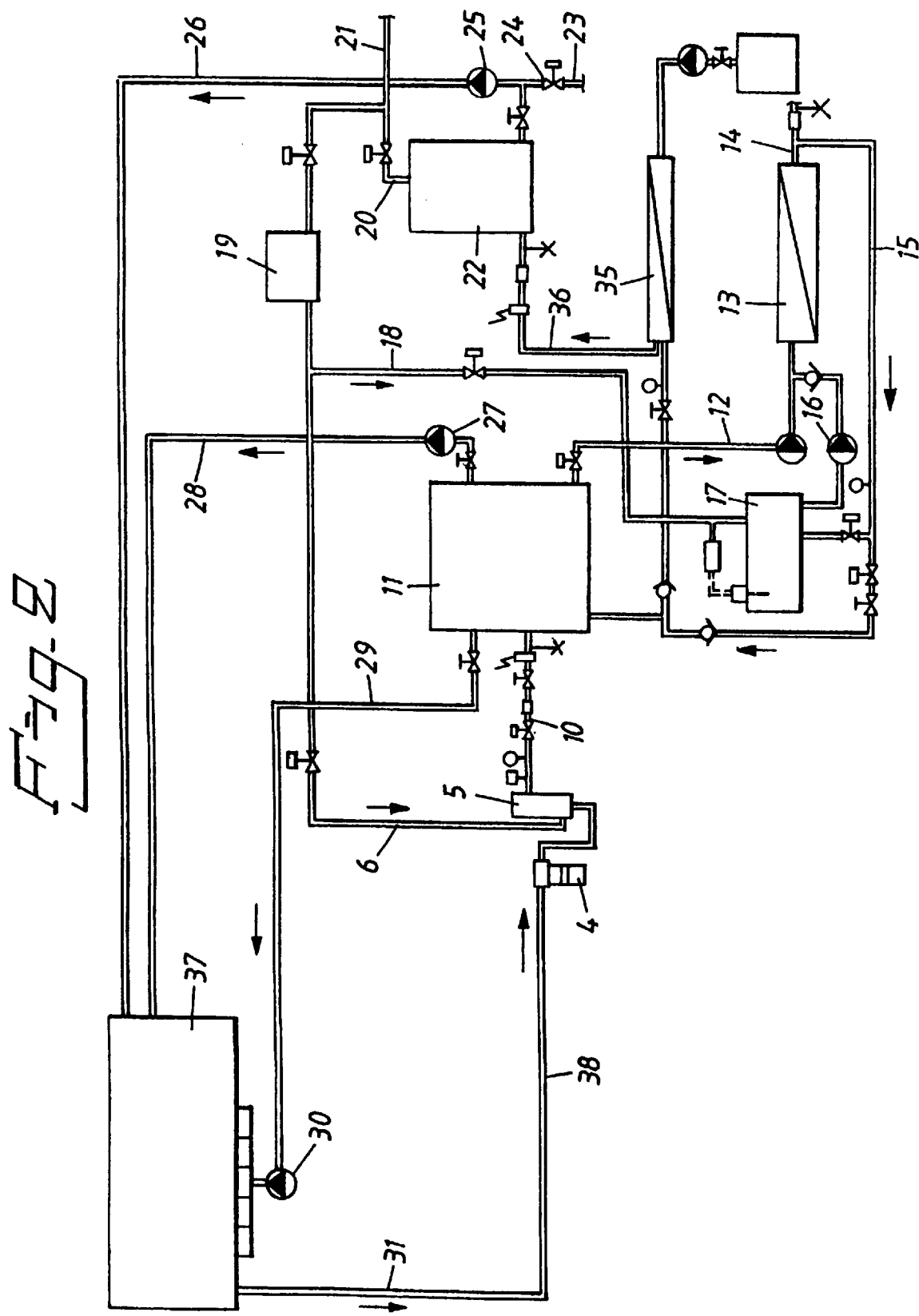

A second embodiment of the invention shown in FIG. 2 lacks the provision of a flocculating chamber and drainage tank 8. The system of apparatus according to this second embodiment will also preferably lack the provision of a sludge separating tank 32. In this case, water is conducted directly from the washing plant 37 to the collection filter 4 through a conduit 38. The system of apparatus is the same as that shown in FIG. 1 in other respects.

In the case of this second embodiment, the fine filter 5 includes a mass based on sawdust that has been treated to render the mass hydrophobic, whereby the mass is able to absorb petroleum products without taking-up any appreciable amount of water. The contaminated water is caused to pass through the mass. Such a mass is retailed by Prolup Absorbent AB, Åtvidaberg, Sweden. The mass can be made hydrophobic, by treating the basic material with Teflon. This provides a product which will reject water while effectively soaking up petroleum products.

According to one preferred embodiment, the mass is admixed with at least one of the following substances: active carbon, aluminum selenite, or synthetically produced selenite. These substances bind heavy metals, therewith effectively purifying the water of such metals.

The aforesaid mass is replaced at pre-determined intervals and the used mass is disposed of together with normal garbage that is later burned or combusted. The mass will have a relatively high calorific value, due to its petroleum product content.

Applicable to both embodiments is that the water cleaned in the fine filter 5 is passed through a conduit means 10 to a buffer tank 11. The water is passed from the buffer tank 11 through a conduit means 12 to at least one membrane filter 13 in which it is finally cleansed with regard to oil. Membrane filters are of a know kind, with which liquid is caused to pass through, e.g., a polyamide material that has small pores. The pore size is typically between 20–80 nanometers. The cleansed part of the water is passed further through a conduit means 14, while the remaining part is passed back to the buffer tank, through a conduit means 15.

The membrane filter 13 is cleaned by pumping an appropriate known washing liquid therethrough from a tank 17 with the aid of a pump 16, wherein the washing liquid is preferably passed through the membrane filter in a direction opposite to the flow direction prevailing in the water-cleansing process. After having passed through the membrane filter, the washing liquid is fed back to the wash tank 17, through the conduit means 15. Clean water or fresh water is delivered to the tank 17 through a conduit means 18.

The fine filter 5 and the tank 17 are both supplied suitably with warm (hot) washing liquid from a water heater 19 which is connected to both a conduit means 20 for clean water and a conduit means 21 connected to the municipal or local water mains.

Water that has been cleansed in the membrane filter 13 is passed from said filter to a second buffer tank 22, either directly or through one or more further filters. This buffer tank is connected to the municipal effluent outlet 23, via a valve 24.

Water is taken from the second buffer tank 22 and delivered to the vehicle-washing plant 37 via a feed pump 25 and a conduit means 26. Water taken from the first-mentioned buffer tank 11 is also delivered to the vehicle-washing plant, via a feed pump 27 and a first conduit means 28. The system also includes a second conduit means 29 leading from the buffer tank 11, wherein water is delivered from the buffer tank to the vehicle-washing plant through said second conduit means 29, via a feed pump 30.

Water that has been used in the vehicle-washing plant and which is contaminated with oil is passed to a conventional slime or sludge separating tank 32, via a drain conduit means 31. Contaminated water is pumped from the tank 32 to the flocculating chamber 2 by means of the earlier mentioned feed pump 1, via conduit means 33.

Alternatively, the sludge separating tank 32 may be omitted. In this case, the conduit means 33 is also omitted and the drain conduit means 31 leading from the vehicle-washing plant is, instead, connected directly to the feed pump, as indicated by the broken line 34.

Thus in accordance with the first embodiment of the inventive method, water from the flocculating chamber 2 is cleansed in a first cleansing stage, by causing the water to flow through the collection filter 4 in which oil flocs are collected. The water will typically have an oil concentration of 150 mg/l upstream of the collection filter 4. In a second cleansing stage, the water from the collection filter 4 is caused to flow through the fine filter 5. This filter functions to reduce the oil content of the water to a level below roughly 50–75 mg/l. It is preferred to lower the oil content to about 20 mg/l in the fine filter.

Essentially the same oil content is obtained downstream of the fine filter 5 in the case of the second embodiment.

In a third cleansing stage, the water from the fine filter 5 is caused to flow through the membrane filter 13 which functions to filter-out at least 75% of the oil remaining in the water. It is possible with the aid of known membrane filters to filter-out about 98% of the remaining oil. At least a substantial part of at least the water cleansed in the membrane filter 13 is cycled back to the vehicle-washing plant, while any remaining part is delivered to a municipal or local sewage network 23. By substantial part is meant here approximately 50%–75%. However, the method includes the recycling of all water.

The water released to the municipal water network and reused after being cleaned will have a very low oil content, below 4 mg/l.

This three-stage process, in which the oil content of the water is lowered to a relatively low level in a second stage, enables a membrane stage to be used as a final stage as regards cleansing water of its oil content. Because the oil content is relatively low after the second stage, it is sufficient to use only one membrane filter of reasonable cost, this filter only needing to be cleaned once each calendar day.

Naturally, when a sludge separator is used, both the sludge separator and the flocculating chamber must be cleansed from the oil that collects in the system. A very large part of this oil, however, is removed from the collection filter 4.

According to one preferred embodiment, the fine filter 5 is cleaned at predetermined time intervals, by causing the washing water to flow in a direction opposite to the direction of water-cleansing flow. The washing water is led through to the flocculating chamber subsequent to cleaning the fine filter.

According to another preferred embodiment, the membrane filter 13 is cleaned at predetermined time intervals by causing washing liquid to flow through the filter, preferably in a direction opposite to the water-cleansing flow direction. The washing liquid may be a suitable liquid oil-solvent and water. The washing liquid is cycled back to the wash tank 17 after having passed through the membrane filter.

The water cleansed in the membrane filter 13 is passed to a second buffer tank 22. Water separated in the membrane filter 13, on the other hand, is passed to the first buffer tank 11.

In the case of the embodiment just described, the system includes two buffer tanks 11, 22 which respectively contain water that has been cleansed to different extents. Although the water in the first buffer tank will contain some oil, the water can still be used conveniently to wash a vehicle and to wash the underneath thereof. The water from the first buffer tank 11 is therefore passed to the actual vehicle-washing plant through a first recycling conduit means 29.

The second buffer tank 22 contains water that is essentially free from oil and heavy metals, among other substances, and can be suitably released as effluent to the municipal sewage network 23. This is also what takes place to a degree which corresponds to water supplied to the municipal drinking water system 21 minus the water that is carried away by washed vehicles in those instances when not all water is recycled. The water in the second buffer tank 22 is far more suitable for the final rinsing of the vehicle than the water contained in the first buffer tank 11. The water in the second buffer tank is therefore passed to the vehicle-washing plant as rinsing water, via a second recycling conduit means 26. It is through this conduit means 26 that fresh municipal water is delivered to the plant.

A vehicle will entrain about 10 liters of water as it moves away after being washed. Consequently, after each wash it is necessary to top up with water from the municipal water mains in an amount corresponding at least to this quantity. As before mentioned, according to one embodiment, all water is recycled, wherein only about 10 liters of fresh water need be supplied to the system with each vehicle wash.

According to another preferred embodiment, the water is caused to flow between the membrane filter 13 and the second buffer tank 23 through a known so-called R/O membrane filter 35 which operates in accordance with the principle of reverse osmosis, such as to cleanse this water of salts, heavy metals and washing detergent. The water separated in the R/O membrane filter 35 is passed to the first buffer tank. Clean water is passed to the second buffer tank 32 through a conduit means 36. De-salting of the water makes it well-suited for use as rinsing water of a drinking water quality.

Thus, the present invention is highly effective in cleansing water, while at the same time recycling water with a low water consumption as a result.

Although the invention has been described with reference to exemplifying embodiments thereof, it will be apparent to the person skilled in this art that other water flow couplings than those illustrated may alternatively be used to achieve the characteristic features of the present invention.

The present invention is therefore not restricted to the aforedescribed embodiments, since modifications and variations can be made within the scope of the following claims.

What is claimed is:

1. A method of extracting oil from oil-contaminated water, including spillage water from gasoline stations and water that emanates from vehicle-washing plants, said method comprising the steps of: passing oil-contaminated water from a source of oil-contaminated water through a collection filter in which oil and coarse particles are collected in a first cleansing stage; passing filtered water from the collecting filter through a fine filter to lower the oil content of the water to a level below approximately 50–75 mg/l in a second cleansing stage, wherein the fine filter includes a mass based on sawdust that has been treated to render the mass hydrophobic so that the mass is able to absorb petroleum products without taking-up any appreciable amount of water, and wherein contaminated water is caused to pass through the mass; passing treated water from the fine filter to flow through a first membrane filter to filter-off at least 75% of the oil remaining in the water in a third cleansing stage; and recycling at least a part of at least the water cleansed in the membrane filter back to the source of the oil-contaminated water; and discharging a residual part of said water from the third cleansing stage to a municipal sewage network.

2. A method according to claim 1, wherein the mass in the fine filter is admixed with a substance selected from the group consisting of active carbon, aluminum selenite, synthetically produced selenite, and combinations thereof.

3. A method according to claim 1, wherein the mass in the fine filter is replaced with fresh mass at pre-determined time intervals.

4. A method according to claim 1, including the steps of flocculating oil contained in the oil-contaminated water within a flocculating chamber upstream of the collection filter; and collecting flocculated oil in the collection filter.

5. A method according in claim 4, including the steps of cleaning the fine filter at predetermined time intervals by causing washing water to flow in a direction opposite to a water-cleansing flow direction; and passing the washing water to the flocculating chamber after the washing water has passed through the fine filter.

6. A method according to claim 1, including the steps of cleaning the first membrane filter at predetermined time intervals by causing washing liquid to flow through the first membrane filter; and passing the washing liquid to a wash tank after passage of the washing liquid through the first membrane filter.

7. A method according to claim 1, including the steps of passing water cleansed in the first membrane filter to a second buffer tank from which water is taken to the vehicle-washing plant; and passing to the first buffer tank water that has passed through the first membrane filter.

8. A method according to claim 1, including the steps of passing water that has passed through the first membrane filter to a reverse osmosis membrane filter positioned between the first membrane filter and the second buffer tank to cleanse the water of salts; and passing water that has passed through the reverse osmosis membrane filter to the first buffer tank.

9. A system for extracting oil from oil-contaminated water, including spillage water from gasoline stations and water that emanates from vehicle-washing plants, said system comprising a collection filter for receiving oil-contaminated water and in which oil and coarse particles are collected in a first cleansing stage; a fine filter to lower the oil content of the water to a level below approximately 50–75 mg/l in a second cleansing stage, wherein the fine filter includes a mass based on sawdust that has been treated to render the mass hydrophobic, whereby the mass is able to absorb petroleum products without taking-up any appreciable amount of water; a first membrane filter to filter-off at least 75% of the oil remaining in the water in a third cleansing stage; and a recycling conduit extending from the first membrane filter to the source of the oil-contaminated water and through which at least a substantial part of at least the water cleansed in the first membrane filter is recycled back to the source of the oil-contaminated water while any residual part of said water from the third cleansing stage is discharged to a municipal sewage network.

10. A system according to claim 9, wherein the mass in the fine filter includes a substance selected from the group consisting of active carbon, aluminum selenite, synthetically produced selenite, and combinations thereof.

11. A system according to claim 9, including an oil-flocculating chamber upstream of and in communication with the collection filter, said collection filter being adapted to collect oil flocs.

12. A system according to claim 9, including a first buffer tank between the fine filter and the first membrane filter, the water cleansed in the fine filter being piped to said first buffer tank through a conduit means; wherein the first buffer tank is connected to the source of the oil-contaminated water by a recycling conduit.

13. A system according to claim 12, including a second buffer tank between and in communication with the first membrane filter and a second recycling conduit means, wherein the water cleansed in the first membrane filter is piped to the second buffer tank through a conduit means.

14. A system according to claim 9, including a reverse osmosis membrane filter positioned between and in communication with the first membrane filter and the second buffer tank for extracting salts from the water.

15. A system according to claim 9, wherein a part of the first membrane filter that contains separated water is connected to the first buffer tank.

* * * * *